(12) United States Patent
Wang et al.

(10) Patent No.: US 11,637,667 B2
(45) Date of Patent: Apr. 25, 2023

(54) METHOD AND APPARATUS FOR TRANSMITTING AND RECEIVING UPLINK SIGNAL, STORAGE MEDIUM, AND ELECTRONIC DEVICE

(71) Applicant: ZTE Corporation, Shenzhen (CN)

(72) Inventors: Yuxin Wang, Shenzhen (CN); Hao Wu, Shenzhen (CN); Zhaohua Lu, Shenzhen (CN); Yu Ngok Li, Shenzhen (CN); Chuangxin Jiang, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 75 days.

(21) Appl. No.: 17/043,026

(22) PCT Filed: Mar. 29, 2019

(86) PCT No.: PCT/CN2019/080555
§ 371 (c)(1),
(2) Date: Sep. 29, 2020

(87) PCT Pub. No.: WO2019/192405
PCT Pub. Date: Oct. 10, 2019

(65) Prior Publication Data
US 2021/0021391 A1 Jan. 21, 2021

(30) Foreign Application Priority Data
Apr. 2, 2018 (CN) .......................... 201810284366.4

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0602* (2013.01); *H04L 5/0023* (2013.01);
(Continued)

(58) Field of Classification Search
CPC ..... H04L 5/0048; H04L 5/005; H04L 5/0051; H04L 5/0014; H04L 5/0023;
(Continued)

(56) References Cited

U.S. PATENT DOCUMENTS

| 8,817,848 B2 * | 8/2014 | Lemson | ........... H04B 10/25753 375/220 |
| 2011/0110357 A1 * | 5/2011 | Chung | .................. H04L 5/0048 370/344 |

(Continued)

FOREIGN PATENT DOCUMENTS

| CN | 1025479900 A | 7/2012 |
| CN | 103905104 A | 12/2012 |

(Continued)

OTHER PUBLICATIONS

International Search Report for corresponding application PCT/CN2019/080555 filed Mar. 29, 2019; dated Jul. 3, 2019.
(Continued)

*Primary Examiner* — Warner Wong
(74) *Attorney, Agent, or Firm* — Cantor Colburn LLP

(57) ABSTRACT

The present disclosure provides a method and apparatus for transmitting and receiving an uplink signal, a storage medium, and an electronic device. The transmitting method includes: a second communication node receives configuration information transmitted by a first communication node through physical downlink control signaling or high-layer signaling, and the second communication node transmits an uplink signal to the first communication node based on the configuration information; or a second communica-
(Continued)

tion node transmits, according to a rule appointed with a first communication node, an uplink signal to the first communication node.

18 Claims, 3 Drawing Sheets

(51) Int. Cl.
  *H04L 27/26* (2006.01)
  *H04W 72/12* (2023.01)
  *H04W 72/1268* (2023.01)
(52) U.S. Cl.
  CPC ...... *H04L 27/2607* (2013.01); *H04L 27/2613* (2013.01); *H04W 72/1257* (2013.01); *H04W 72/1268* (2013.01); *H04W 72/1289* (2013.01)
(58) Field of Classification Search
  CPC ............. H04L 27/2605; H04L 27/2607; H04L 27/261; H04L 27/2613; H04L 41/08; H04L 41/0803; H04L 41/0806; H04W 72/1263; H04W 72/1289; H04W 72/1205; H04W 72/1257; H04W 72/1268; H04B 7/06; H04B 7/0602; H04B 7/0404; H04B 2201/698
  See application file for complete search history.

(56) References Cited

U.S. PATENT DOCUMENTS

| | | | | |
|---|---|---|---|---|
| 2011/0274043 | A1* | 11/2011 | Nam | H04L 5/0023 370/328 |
| 2012/0113869 | A1* | 5/2012 | Gaal | H04L 5/0048 370/255 |
| 2013/0128826 | A1* | 5/2013 | Lin | H04W 72/04 370/329 |
| 2013/0170447 | A1* | 7/2013 | Lin | H04L 5/0053 370/329 |
| 2014/0050165 | A1* | 2/2014 | Park | H04L 1/1854 370/329 |
| 2015/0245246 | A1* | 8/2015 | Golitschek Edler von Elbwart | H04L 27/2602 370/280 |
| 2016/0013924 | A1 | 1/2016 | Li | |
| 2016/0080133 | A1* | 3/2016 | Golitschek Edler von Elbwart | H04L 5/1469 370/280 |
| 2018/0063792 | A1* | 3/2018 | Sirotkin | H04W 52/0216 |
| 2018/0176902 | A1* | 6/2018 | Huang | H04W 72/0413 |
| 2018/0279298 | A1* | 9/2018 | Wang | H04W 72/048 |
| 2018/0343101 | A1* | 11/2018 | Dinan | H04W 72/0413 |
| 2018/0376510 | A1* | 12/2018 | Sun | H04W 74/0833 |
| 2019/0230580 | A1* | 7/2019 | Kim | H04W 48/16 |
| 2019/0261234 | A1* | 8/2019 | Park | H04W 36/0072 |
| 2020/0275260 | A1* | 8/2020 | Huang | H04L 5/0094 |
| 2020/0358493 | A1* | 11/2020 | Hao | H04B 7/0456 |

FOREIGN PATENT DOCUMENTS

| | | |
|---|---|---|
| CN | 105451155 A | 3/2016 |
| CN | 107734686 A | 2/2018 |
| CN | 108768599 A | 11/2018 |
| EP | 3468087 A1 | 4/2019 |
| WO | 2012077971 A2 | 6/2012 |
| WO | 2018006752 A1 | 1/2018 |

OTHER PUBLICATIONS

European Search Report for corresponding application EP19781616; Report dated May 19, 2021.
Huawei HiSilicon, "SRS Switching for UE's with multiple antennas", 3GPP TSG RAN WGI Meeting #86, Gothenburg, Sweden Aug. 22-26, 2016, R1-166133.
Huawei, Hi Silicon,"Antenna Selection transmission for PUSCH", 3GPP TSG RAN WGI Meeting #92, Athens Greece, Feb. 26-Mar. 2, 2018, R1-1801810.
Qualcomm Incorporated, "Remaining Details on SRS", 3GPP TSG RAN WG1 Meeting 90bis, Pargue CZ, Oct. 9-13, R1-1718549.

* cited by examiner

Fig. 1

A second communication node receives configuration information transmitted by a first communication node through physical downlink control signaling or high-layer signaling, and the second communication node transmits an uplink signal to the first communication node based on the configuration information; or a second communication node transmits, according to a rule appointed with a first communication node, an uplink signal to the first communication node — S202

Fig. 2

A first communication node transmits configuration information to a second communication node through physical downlink control signaling or high-layer signaling, and the first communication node receives an uplink signal transmitted by the second communication node based on the configuration information; or a first communication node receives, according to a rule appointed with a second communication node, an uplink signal transmitted by the second communication node — S302

Fig. 3

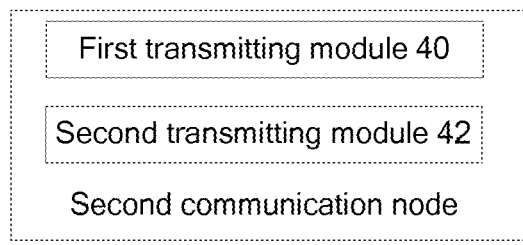

Fig. 4

METHOD AND APPARATUS FOR TRANSMITTING AND RECEIVING UPLINK SIGNAL, STORAGE MEDIUM, AND ELECTRONIC DEVICE

TECHNICAL FIELD

The present disclosure relates to the field of communications, and more particularly to a method and apparatus for transmitting and receiving an uplink signal, a storage medium, and an electronic device.

BACKGROUND

In related technologies, in a New Radio Access Technology (NR), a first communication node of a high-frequency communication system configures a large number of antennas which forms downlink transmission beams to compensate for the spatial fading of high-frequency communication, and a second communication node also configures a large number of antennas which forms uplink transmission beams. In the NR technologies, a Sounding Reference Signal (SRS) is transmitted in the form of a beam. For different uplink signals, such as a Physical Uplink Shared Channel (PUSCH) signal, an uplink demodulation reference signal or an SRS, if these signals are transmitted by different antennas, there is no corresponding implementation scheme in related technologies for how to ensure that a User Equipment (UE) can be smoothly switched in a time domain.

SUMMARY

Embodiments of the present disclosure provide a method and apparatus for transmitting and receiving an uplink signal, a storage medium, and an electronic device.

According to an embodiment of the present disclosure, a method for transmitting an uplink signal is provided, which may include: a second communication node receives configuration information transmitted by a first communication node through physical downlink control signaling or high-layer signaling, and the second communication node transmits an uplink signal to the first communication node based on the configuration information; or a second communication node transmits, according to a rule appointed with a first communication node, an uplink signal to the first communication node.

According to an embodiment of the present disclosure, a method for receiving an uplink signal is provided, which may include: a first communication node transmits configuration information to a second communication node through physical downlink control signaling or high-layer signaling, and the first communication node receives an uplink signal transmitted by the second communication node based on the configuration information; or a first communication node receives, according to a rule appointed with a second communication node, an uplink signal transmitted by the second communication node.

According to another embodiment of the present disclosure, an apparatus for transmitting an uplink signal is provided, which may include: a first transmitting module, configured to receive configuration information transmitted by a first communication node through physical downlink control signaling or high-layer signaling, and transmit an uplink signal to the first communication node based on the configuration information; or a second transmitting module, configured to transmit, according to a rule appointed with a first communication node, an uplink signal to the first communication node.

According to another embodiment of the present disclosure, an apparatus for receiving an uplink signal is provided, which may include: a first receiving module, configured to transmit configuration information to a second communication node through physical downlink control signaling or high-layer signaling, and receive an uplink signal transmitted by the second communication node based on the configuration information; or a first receiving module, configured to receive, according to a rule appointed with a second communication node, an uplink signal transmitted by the second communication node.

According to another embodiment of the present disclosure, a storage medium is also provided. The storage medium may store a computer program that, when being executed, performs the operations in any one of the above method embodiments.

According to yet another embodiment of the present disclosure, an electronic device is also provided. The electronic device may include a memory and a processor. The memory may store a computer program. The processor may be configured to execute the computer program to perform the operations in any one of the above method embodiments.

BRIEF DESCRIPTION OF THE DRAWINGS

The accompanying drawings described herein are used to provide a deeper understanding of the present disclosure, and constitute a part of the present application, and the exemplary embodiments of the present disclosure and the description thereof are used to explain the present disclosure, but do not constitute improper limitations to the present disclosure. In the drawings:

FIG. 1 is a network architecture diagram of an embodiment of the present disclosure;

FIG. 2 is a flowchart of a method for transmitting an uplink signal according to an embodiment of the present disclosure;

FIG. 3 is a flowchart of a method for receiving an uplink signal according to an embodiment of the present disclosure;

FIG. 4 is a structural block diagram of an apparatus for transmitting an uplink signal according to an embodiment of the present disclosure;

DETAILED DESCRIPTION OF THE EMBODIMENTS

Figure 5:
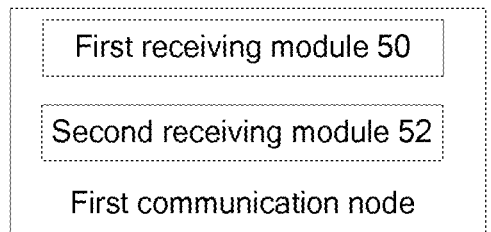
FIG. 5 is a structural block diagram of an apparatus for receiving an uplink signal according to an embodiment of the present disclosure.

The present disclosure is described below with reference to the drawings and in conjunction with the embodiments in detail. It is to be noted that embodiments in the present application and characteristics in the embodiments may be combined under the condition of no conflicts.

It is to be noted that the specification and claims of the present disclosure and the terms "first", "second" and the like in the drawings are used to distinguish similar objects, and do not need to describe a specific sequence or a precedence order.

Embodiment 1

The embodiment of the present application may be implemented in a network architecture shown in FIG. 1. FIG. 1 is a network architecture diagram of an embodiment of the present disclosure. As shown in FIG. 1, the network architecture includes: a first communication node and a second communication node. The first communication node transmits an uplink signal to the second communication node.

The first communication node may be a node such as a base station of a macro cell, a base station or transmission node of a small cell, a transmitting node in a high-frequency communication system and a transmitting node in an Internet of Things system. The second communication node may be a node, such as a UE, a mobile phone, a portable device or a vehicle, in communication systems.

In Long Term Evolution (LTE), a Physical Downlink Control Channel (PDCCH) is used to carry Downlink Control Information (DCI). The DCI may include uplink and downlink scheduling information, and uplink power control information. A DCI format includes DCI formats 0, 1, 1A, 1B, 1C, 1D, 2, 2A, 3, 3A, etc., and DCI formats 2B, 2C, 2D are added after evolved to LTE-A Release 12 to support a variety of different applications and transmission modes. The first communication node, such as an evolved base station (e-Node-B, referred to as eNB), may configure a second communication node device, such as a UE, through DCI, or a second communication node device receives the configuration from higher layers, also referred to as high-layer signaling to configure a UE.

An SRS is a signal used between a second communication node device and a first communication node to measure wireless Channel State Information (CSI). In an LTE system, a UE periodically transmits an uplink SRS on the last data symbol of a transmitting subframe according to parameters such as frequency band, frequency domain position, sequence cyclic shift, period, and subframe offset indicated by an eNB. The eNB judges uplink CSI of the UE according to the received SRS, and performs operations such as frequency domain selection scheduling and closed-loop power control according to the obtained CSI.

In the study of LTE-A Release 10, it is proposed that in uplink communication, a non-precoded SRS (namely, an antenna-specific SRS) should be used, and a De-Modulation Reference Signal (DMRS) of a PUSCH is pre-coded. The first communication node can estimate the original uplink CSI through receiving the non-precoded SRS, but the pre-coded DMRS cannot enable the first communication node to estimate the original uplink CSI. In such a case, when the UE uses multiple antennas to transmit non-precoded SRS, the SRS resources required by each UE will increase, which causes the number of UEs that can be multiplexed simultaneously in the system to decrease. The UE may transmit an SRS through two triggering modes: high-level signaling (also known as trigger type 0) or DCI (also known as trigger type 1 trigger). The periodic SRS is triggered based on the high-level signaling. The non-periodic SRS is triggered based on the DCI. In LTE-A Release 10, a non-periodic SRS transmitting mode is added, which improves the utilization rate of SRS resources and improves the flexibility of resource scheduling to a certain extent.

With the development of communication technologies, the demand for data services continues to increase, and the available low-frequency carrier is also very scarce. Therefore, communication based on underutilized high-frequency (30-300 GHz) carriers has become one of important communication means for future high-speed data communication. The available bandwidth of high-frequency carrier communication is very large and effective high-speed data communication can be provided. However, a big technical challenge for high-frequency carrier communication is that, compared with a relatively low-frequency signal, a high-frequency signal has a very large fading in space. Although there is fading loss in space for the high-frequency signal in outdoor communication, more antennas can usually be used due to the wavelength decrease, so that the fading loss in space can be compensated via conducting communication based on beams.

However, when the number of antennas increases, each antenna needs to be provided with a set of radio frequency links, digital-based beamforming also brings about increased cost and power loss. Therefore, the current research is more focused on hybrid beamforming, that is, a radio frequency beam and a digital beam in combination form a final beam.

The uplink signal may be an SRS, or an uplink DMRS, or an uplink signal for random access, or a PUSCH signal, or a phase tracking reference signal.

The antenna port may also be called a transmitting port or an uplink signal port.

A method for transmitting an uplink signal implemented in the above network architecture is provided in the present embodiment. FIG. 2 is a flowchart of a method for transmitting an uplink signal according to an embodiment of the present disclosure. As shown in FIG. 2, the flow includes the following operations.

In operation S202, a second communication node receives configuration information transmitted by a first communication node through physical downlink control signaling or high-layer signaling, and the second communication node transmits an uplink signal to the first communication node based on the configuration information; or a second communication node transmits, according to a rule appointed with a first communication node, an uplink signal to the first communication node.

FIG. 3 is a flowchart of a method for receiving an uplink signal according to an embodiment of the present disclosure. As shown in FIG. 3, the flow includes the following operations.

In operation S302, a first communication node transmits configuration information to a second communication node through physical downlink control signaling or high-layer signaling, and the first communication node receives an uplink signal transmitted by the second communication node based on the configuration information; or a first communication node receives, according to a rule appointed with a second communication node, an uplink signal transmitted by the second communication node.

In the solution of the present embodiment, an uplink signal to be transmitted is acquired. The uplink signal includes: a first uplink signal and a second uplink signal. It is determined whether a first antenna used for transmitting the first uplink signal is consistent with a second antenna used for transmitting the second uplink signal. It is determined whether to reserve a guard period between the first uplink signal and the second uplink signal according to a determination result. When the first antenna and the second antenna are consistent, a guard period is not reserved between the first uplink signal and the second uplink signal. When the first antenna and the second antenna are inconsistent, a guard period is reserved between the first uplink signal and the second uplink signal.

Through the above operations, transmitting antennas of different uplink signals are determined, and when different antennas are used to transmit the uplink signals, a guard period is reserved between the first uplink signal and the second uplink signal to ensure that a UE can smoothly switch the uplink signals in a time domain. The technical problem in the related art that different uplink signals transmitted by different antennas cannot be smoothly switched in a time domain is solved.

In some exemplary embodiments, antenna or antenna group information may be identification information of an antenna or antenna group, port information of the antenna or antenna group, or beam identification information corresponding to the antenna or antenna group.

In some exemplary embodiments, the uplink signal includes a first uplink signal and a second uplink signal. The appointed rule includes one of the following: an antenna port used for transmitting the first uplink signal is consistent with an antenna port used for transmitting the second uplink signal on an adjacent time domain symbol in a slot in which the first uplink signal is transmitted; when a Modulation and Coding Scheme (MCS) index of the second uplink signal is less than or equal to a preset value, the second uplink signal on a specified number of time domain symbols at an adjacent time domain position of the first uplink signal is punctured; when the MCS index of the second uplink signal is greater than the preset value, the first uplink signal on a specified number of time domain symbols at an adjacent time domain position of the second uplink signal is punctured, or the first uplink signal is not transmitted at an adjacent time domain position of the second uplink signal; a guard period with a length of Y symbols is reserved between the first uplink signal and the second uplink signal, wherein the value of Y is related to a subcarrier interval used by the second communication node; and the second communication node decides to puncture the second uplink signal on a specified number of time domain symbols, or the second communication node decides whether to transmit the first uplink signal at an adjacent time domain symbol position of the second uplink signal.

In some exemplary embodiments, the rule that an antenna port used for transmitting the first uplink signal is consistent with an antenna port used for transmitting the second uplink signal on an adjacent time domain symbol in a slot in which the first uplink signal is transmitted includes one of the following: when the first uplink signal is configured to adopt antenna switching transmission, an antenna port used at a first time domain symbol for transmitting the first uplink signal is consistent with an antenna port used for transmitting the second uplink signal in the same slot; and when the first uplink signal is configured to adopt antenna switching transmission, an antenna port used for transmitting the first uplink signal at a time domain position corresponding to the first reference signal resource is consistent with an antenna port used for transmitting the second uplink signal in the same slot.

In some exemplary embodiments, the rule that a guard period with a length of Y symbols is reserved between the first uplink signal and the second uplink signal includes: when an antenna port used for the first uplink signal is inconsistent with an antenna port used for the second uplink signal, a guard period with a length of Y symbols is reserved between the first uplink signal and the second uplink signal.

In some exemplary embodiments, the configuration information includes one or more slot offsets. The operation that the second communication node transmits an uplink signal to the first communication node based on the configuration information includes: in a case where the number of the one or more slot offsets in the configuration information is 1 and reference signal resources in a reference signal resource set configured by the first communication node for the second communication node are distributed in slot 1 and slot 2, the second communication node transmits the uplink signal to the first communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, the second communication node transmits the uplink signal to the first communication node in slot 1 and slot 2. Correspondingly, the operation that the first communication node receives an uplink signal transmitted by the second communication node based on the configuration information includes: in a case where the number of the one or more slot offsets in the configuration information is 1 and reference signal resources in a reference signal resource set configured by the first communication node for the second communication node are distributed in slot 1 and slot 2, the first communication node receives the uplink signal transmitted by the second communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, the first communication node receives the uplink signal transmitted by the second communication node in slot 1 and slot 2.

In some exemplary embodiments, the uplink signal is distributed at a first time domain position and a second time domain position. The first time domain position includes one of the following: a time domain position of a guard period between a downlink control region and a PUSCH, a time domain position of a guard period between a downlink control region and a PUCCH, a time domain position of a guard period between a downlink control region and an uplink DMRS, and a position of first N time domain symbols of a slot, where N is a positive integer less than or equal to 14. The second time domain position includes one of the following: a position of the last M time domain symbols of a slot, where M is a positive integer less than or equal to 14.

In some exemplary embodiments, when an SRS at the first time domain position is inconsistent with an antenna port used by the uplink DMRS, a guard period with a length of Y symbols is reserved between the SRS and the uplink DMRS.

In some exemplary embodiments, the uplink signal located at the first time domain position and the uplink signal located at the second time domain position belong to uplink signals corresponding to different resources in a same reference signal resource set; or, the uplink signal located at the first time domain position and the uplink signal located at the second time domain position respectively belong to uplink signals corresponding to resources in different reference signal resource sets.

In some exemplary embodiments, a sounding reference resource set configured by the first communication node to the second communication node occupies K slots, or sounding reference signal resources in a sounding reference resource set configured by the first communication node to the second communication node are distributed in K slots, where K is an integer greater than 1.

In some exemplary embodiments, in the K slots, starting from the second slot, Y symbols are reserved between an SRS at the first occupied time domain symbol position and a PUSCH or PUCCH or uplink DMRS as a guard period.

In some exemplary embodiments, the value of Y is the same as the number of time domain symbols occupied by a guard period between SRS resources in a slot.

In some exemplary embodiments, the first uplink signal is an SRS, and the second uplink signal includes at least one of the following: an uplink DMRS, an uplink signal for random access, a PUSCH signal, a phase tracking reference signal, and a PUCCH signal.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

Embodiment 2

In the present embodiment, transmitting and receiving apparatuses are also provided. The apparatuses are used to implement the above embodiments and preferred implementation manners, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

FIG. 4 is a structural block diagram of an apparatus for transmitting an uplink signal according to an embodiment of the present disclosure. As shown in FIG. 4, the apparatus includes: a first transmitting module 40 or a second transmitting module 42.

The first transmitting module 40 is configured to receive configuration information transmitted by a first communication node through physical downlink control signaling or high-layer signaling, and transmit an uplink signal to the first communication node based on the configuration information.

The second transmitting module 42 is configured to transmit, according to a rule appointed with a first communication node, an uplink signal to the first communication node.

FIG. 5 is a structural block diagram of an apparatus for receiving an uplink signal according to an embodiment of the present disclosure. As shown in FIG. 5, the apparatus includes: a first receiving module 50 or a second receiving module 52.

The first receiving module 50 is configured to transmit configuration information to a second communication node through physical downlink control signaling or high-layer signaling, and receive an uplink signal transmitted by the second communication node based on the configuration information.

The second receiving module 52 is configured to receive, according to a rule appointed with a second communication node, an uplink signal transmitted by the second communication node.

In some exemplary embodiments, in the above transmitting apparatus or receiving apparatus, the uplink signal includes a first uplink signal and a second uplink signal. The appointed rule includes one of the following: an antenna port used for transmitting the first uplink signal is consistent with an antenna port used for transmitting the second uplink signal on an adjacent time domain symbol in a slot in which the first uplink signal is transmitted; when an MCS index of the second uplink signal is less than or equal to a preset value, the second uplink signal on a specified number of time domain symbols at an adjacent time domain position of the first uplink signal is punctured; when the MCS index of the second uplink signal is greater than the preset value, the first uplink signal on a specified number of time domain symbols at an adjacent time domain position of the second uplink signal is punctured, or the first uplink signal is not transmitted at an adjacent time domain position of the second uplink signal; a guard period with a length of Y symbols is reserved between the first uplink signal and the second uplink signal, wherein the value of Y is related to a subcarrier interval used by the second communication node; and the second communication node decides to puncture the second uplink signal on a specified number of time domain symbols, or the second communication node decides whether to transmit the first uplink signal at an adjacent time domain symbol position of the second uplink signal.

In some exemplary embodiments, in the above transmitting apparatus or receiving apparatus, the rule that an antenna port used for transmitting the first uplink signal is consistent with an antenna port used for transmitting the second uplink signal on an adjacent time domain symbol in a slot in which the first uplink signal is transmitted includes one of the following: when the first uplink signal is configured to adopt antenna switching transmission, an antenna port used at a first time domain symbol for transmitting the first uplink signal is consistent with an antenna port used for transmitting the second uplink signal in the same slot; and when the first uplink signal is configured to adopt antenna switching transmission, an antenna port used for transmitting the first uplink signal at a time domain position corresponding to the first reference signal resource is consistent with an antenna port used for transmitting the second uplink signal in the same slot.

In some exemplary embodiments, the rule that a guard period with a length of Y symbols is reserved between the first uplink signal and the second uplink signal includes: when an antenna port used for the first uplink signal is inconsistent with an antenna port used for the second uplink signal, a guard period with a length of Y symbols is reserved between the first uplink signal and the second uplink signal.

In some exemplary embodiments, the configuration information includes one or more slot offsets. In the above transmitting apparatus or receiving apparatus, the operation that the second communication node transmits an uplink signal to the first communication node based on the configuration information includes: in a case where the number of the one or more slot offsets in the configuration information is 1 and reference signal resources in a reference signal resource set configured by the first communication node for the second communication node are distributed in slot 1 and slot 2, the second communication node transmits the uplink signal to the first communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, the second communication node transmits the uplink signal to the first communication node in slot 1 and slot 2. Correspondingly, the operation that the first communication node receives an uplink signal transmitted by the second communication node based on the configuration information includes: in a case where the number of the one or more slot offsets in the configuration information is 1 and reference signal resources in a reference signal resource set configured by the first communication node for the second communication node are distributed in slot 1 and slot 2, the first communication node receives the uplink signal transmitted by the second communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, the first communication node receives the uplink signal transmitted by the second communication node in slot 1 and slot 2.

In some exemplary embodiments, the uplink signal is distributed at a first time domain position and a second time domain position. The first time domain position includes one of the following: a time domain position of a guard period between a downlink control region and a PUSCH, a time domain position of a guard period between a downlink control region and a PUCCH, a time domain position of a guard period between a downlink control region and an uplink DMRS, and a position of first N time domain symbols of a slot, where N is a positive integer less than or equal to 14. The second time domain position includes one of the following: a position of the last M time domain symbols of a slot, where M is a positive integer less than or equal to 14.

In some exemplary embodiments, when an SRS at the first time domain position is inconsistent with an antenna port used by the uplink DMRS, a guard period with a length of Y symbols is reserved between the SRS and the uplink DMRS.

In some exemplary embodiments, the uplink signal located at the first time domain position and the uplink signal located at the second time domain position belong to uplink signals corresponding to different resources in a same reference signal resource set; or, the uplink signal located at the first time domain position and the uplink signal located at the second time domain position respectively belong to uplink signals corresponding to resources in different reference signal resource sets.

In some exemplary embodiments, a sounding reference resource set configured by the first communication node to the second communication node occupies K slots, or sounding reference signal resources in a sounding reference signal resource set configured by the first communication node to the second communication node are distributed in K slots, where K is an integer greater than 1.

In some exemplary embodiments, in the K slots, starting from the second slot, Y symbols are reserved between an SRS at the first occupied time domain symbol position and a PUSCH or PUCCH or uplink DMRS as a guard period.

In some exemplary embodiments, the value of Y is the same as the number of time domain symbols occupied by a guard period between SRS resources in a slot.

In some exemplary embodiments, the first uplink signal is an SRS, and the second uplink signal includes at least one of the following: an uplink DMRS, an uplink signal for random access, a PUSCH signal, a phase tracking reference signal, and a PUCCH signal.

It is to be noted that each of the above modules may be implemented by software or hardware. For the latter, it may be implemented by, but not limited to, the following manners that the above modules are all located in the same processor; or, the above modules are located in different processors in any combination form respectively.

Embodiment 3

The present embodiment is an exemplary embodiment of the present application, including multiple implementations, for detailed and supplementary explanation of the solution of the present application:

Implementation 1

Through SRS antenna switching, the problem of channel reciprocity when the number of transmitting links and the number of receiving links of the second communication node are inconsistent can be solved, for example, when the second communication node is configured to adopt 1T2R, 2T4R, or 4T8R. Herein, T represents the number of transmitting links, and R represents the number of receiving links. For example, 1T2R represents that the number of transmitting links is 1 and the number of receiving links is 2.

Figure 6:
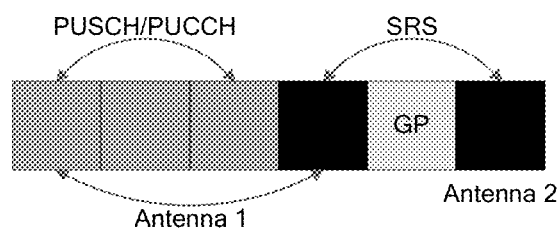
FIG. 6 is a schematic diagram of transmitting an SRS and a PUSCH/PUCCH using one slot in Implementation 1 of the present disclosure.

FIG. 6 is a schematic diagram of transmitting an SRS and a PUSCH/PUCCH using one slot in Implementation 1 of the present disclosure. As shown in FIG. 6, for SRS antenna switching for 1T2R, if an antenna used at a first time domain symbol for transmitting an SRS is consistent with an antenna used at a previous symbol for transmitting a PUSCH/PUCCH, a time domain guard period does not need to be reserved between the SRS and the PUSCH/PUCCH. If an antenna used at a first time domain symbol for transmitting an SRS is inconsistent with an antenna used at a previous symbol for transmitting a PUSCH/PUCCH, a time domain guard period is reserved between the SRS and the PUSCH/PUCCH.

Implementation 2

Figure 7:
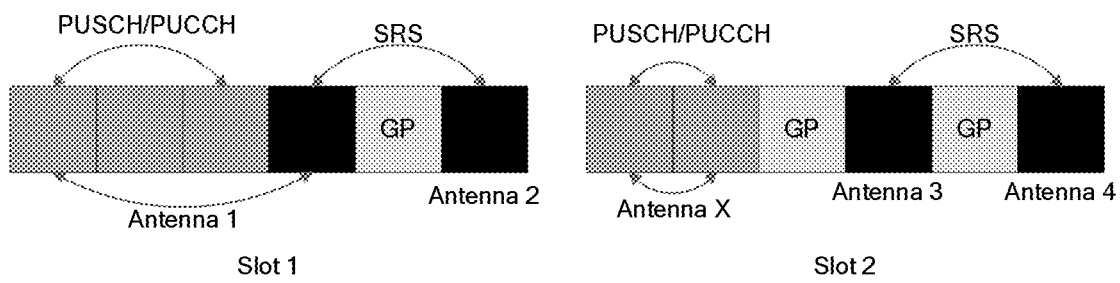
FIG. 7 is a schematic diagram of transmitting an SRS and a PUSCH/PUCCH using two slots in Implementation 2 of the present disclosure.

For non-periodic SRS antenna switching for 1T4R, a base station needs to configure 4 SRS resources for a UE, and each SRS resource occupies 1 time domain symbol. Because the current protocol only supports a maximum of 6 symbols in each slot for SRS transmission, at least two slots are required to complete the 4-antenna switching of an SRS. As shown in FIG. 7, FIG. 7 is a schematic diagram of transmitting an SRS and a PUSCH/PUCCH using two slots in Implementation 2 of the present disclosure. In slot 1, if the same antenna as the one used for transmitting the PUSCH/PUCCH is used to transmit the SRS at the first symbol for transmitting the SRS, then a time domain guard period does not need to be reserved between the PUSCH/PUCCH and the SRS of the slot 1. In slot 2, if an antenna for transmitting the PUSCH/PUCCH is different from an antenna used at an adjacent symbol for transmitting the SRS in slot 2, a guard period with a length of Y symbols is reserved between the PUSCH/PUCCH and the SRS, and the value of Y is related to a subcarrier interval used by the UE. Table 1 shows a correspondence between a subcarrier interval and Y.

TABLE 1

| μ | $\Delta f = 2^\mu \cdot 15$ [kHz] | Y [Symbol] |
|---|---|---|
| 0 | 15 | 1 |
| 1 | 30 | 1 |
| 2 | 60 | 1 |
| 3 | 120 | 2 |

Implementation 3

For non-periodic SRS antenna switching for 1T4R, if an antenna for transmitting a PUSCH/PUCCH is different from an antenna used at an adjacent symbol for transmitting the SRS in a current slot, a UE decides, according to an MCS index or a modulation order or a code rate of the PUSCH/PUCCH, whether to puncture the PUSCH/PUCCH on the Y time domain symbols, and the Y time domain symbols are used as a guard period. For example, when the MCS index is less than or equal to 5, the UE will puncture the PUSCH/PUCCH on the Y time domain symbols. When the MCS index is greater than 5, the UE does not puncture the PUSCH/PUCCH on the Y time domain symbols, but an SRS is not transmitted on adjacent time domain symbols of the PUSCH/PUCCH.

Implementation 4

For non-periodic SRS antenna switching for 1T4R, a UE decides whether to puncture the PUSCH/PUCCH on the Y time domain symbols or not to transmit an SRS on adjacent time domain symbols of the PUSCH/PUCCH, and a base station obtains, through blind detection, the information concerning whether there is a guard period between the PUSCH/PUCCH and the SRS.

Implementation 5

For non-periodic SRS antenna switching for 1T4R, the allocation of SRS resources between slots (the number of SRS resources allocated on slot 1+the number of SRS resources allocated on slot 2) may follow the following modes: 2+2; 3+1; and 1+3.

For the 2+2 resource allocation mode, standard protocolization is relatively simple, but the SRS resource utilization efficiency is not high; while the 3+1 and 1+3 resource allocation modes may fully utilize SRS resources based on an available SRS resource size in the slot.

In order to support the three resource allocation modes, the UE may decide which resource allocation mode to use according to the number of slot offsets configured by the base station. If the number of slot offsets configured via RRC is 1, the UE adopts an adaptive resource allocation mode, i.e., the 3+1 or 1+3 resource allocation mode. If the number of slot offsets configured via RRC is 2, the UE adopts the simple resource configuration mode of 2+2.

Implementation 6

Figure 8:
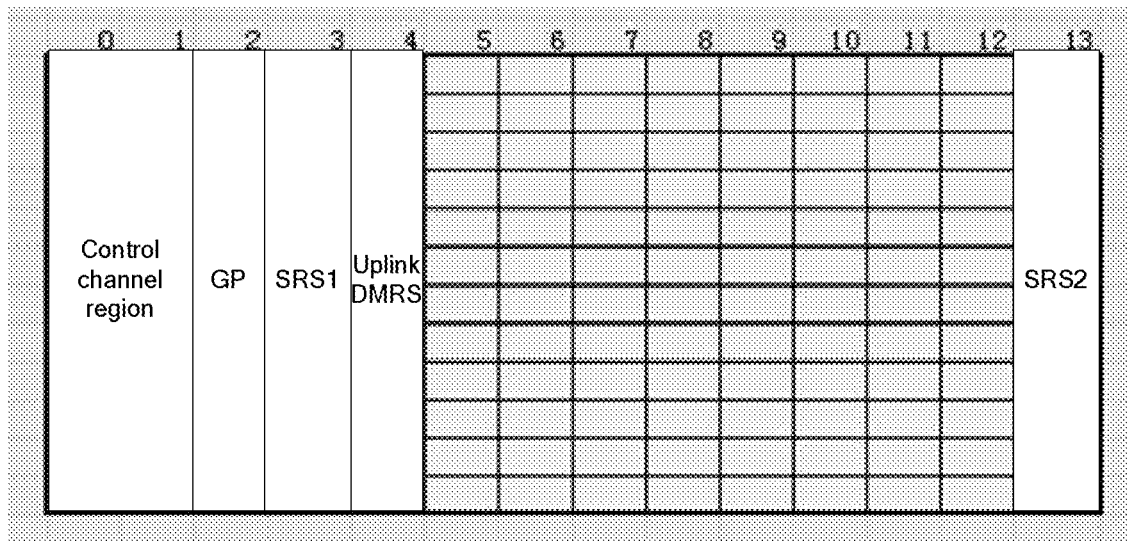
FIG. 8 is a schematic diagram of a time domain position of an SRS in Implementation 6 of the present disclosure.

In order to enable channel information obtained by measuring an SRS to be quickly applied to subsequent scheduling, the SRS may be configured at a time domain symbol position before the position of an uplink DMRS, or configured in a guard period between the downlink control and the PUSCH or the uplink DMRS. As shown in FIG. 8, FIG. 8 is a schematic diagram of a time domain position of an SRS in Implementation 6 of the present disclosure.

When transmitting antennas used by SRS1 and an uplink DMRS are no the same, a guard period with a length of Y symbols is suggested to be reserved between the SRS1 and the uplink DMRS.

SRS1 and SRS2 belong to different resources in the same SRS resource set, or SRS1 and SRS2 belong to different SRS resource sets respectively.

The UE reports processing speed-related capabilities, and the base station determines whether to trigger SRS1 in the current slot according to the capabilities and the configured guard period size.

Embodiment 4

The embodiment of the present disclosure also provides a storage medium. The storage medium stores a computer program that, when being executed, performs the operations in any one of the above method embodiments.

In the present embodiment, the storage medium may be configured to store a computer program for performing the following operations.

In S1, configuration information transmitted by a first communication node through physical downlink control signaling or high-layer signaling is received, and an uplink signal is transmitted to the first communication node based on the configuration information; or according to a rule appointed with a first communication node, an uplink signal is transmitted to the first communication node.

In the present embodiment, the storage medium may include, but is not limited to, various media capable of storing a computer program such as a U disk, a ROM, a RAM, a mobile hard disk, a magnetic disk or an optical disc.

The embodiment of the present disclosure also provides an electronic device. The electronic device includes a memory and a processor. The memory stores a computer program. The processor is configured to execute the computer program to perform the operations in any one of the above method embodiments.

In some exemplary embodiments, the electronic device may further include a transmission device and an input-output device. The transmission device is connected to the processor, and the input-output device is connected to the processor.

In the present embodiment, the processor may be configured to use the computer program to perform the following operations.

In S1, configuration information transmitted by a first communication node through physical downlink control signaling or high-layer signaling is received, and an uplink signal is transmitted to the first communication node based on the configuration information; or according to a rule appointed with a first communication node, an uplink signal is transmitted to the first communication node.

In some exemplary embodiments, a specific example in the present embodiment may refer to the examples described in the above embodiments and alternative implementation manners, and details are not described herein in the present embodiment.

It is apparent that a person skilled in the art shall understand that all of the above-mentioned modules or operations in the present disclosure may be implemented by using a general calculation apparatus, may be centralized on a single calculation apparatus or may be distributed on a network composed of multiple calculation apparatuses. In some exemplary embodiments, they may be implemented by using executable program codes of the calculation apparatuses. Thus, they may be stored in a storage apparatus and executed by the calculation apparatuses, the shown or described operations may be executed in a sequence different from this sequence under certain conditions, or they are manufactured into each integrated circuit module respectively, or multiple modules or operations therein are manufactured into a single integrated circuit module. Thus, the present disclosure is not limited to the combination of any specific hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A method for transmitting an uplink signal, comprising:
   receiving, by a second communication node, configuration information transmitted by a first communication node through physical downlink control signaling or high-layer signaling, and transmitting, by the second communication node, an uplink signal to the first communication node based on the configuration information, wherein the configuration information comprises one or more slot offsets;
   or,
   transmitting, by a second communication node according to a rule appointed with a first communication node, an uplink signal to the first communication node;
   wherein transmitting, by the second communication node, an uplink signal to the first communication node based on the configuration information comprises: in a case where the number of the one or more slot offsets in the configuration information is 1 and reference signal resources in a reference signal resource set configured by the first communication node for the second communication node are distributed in slot 1 and slot 2, transmitting, by the second communication node, the uplink signal to the first communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, transmitting, by the second communication node, the uplink signal to the first communication node in slot 1 and slot 2.

2. The method according to claim 1, wherein the uplink signal comprises a first uplink signal and a second uplink signal, and the appointed rule comprises one of the following:
   an antenna port used for transmitting the first uplink signal is consistent with an antenna port used for transmitting the second uplink signal on an adjacent time domain symbol in a slot in which the first uplink signal is transmitted;
   when a Modulation and Coding Scheme (MCS) index of the second uplink signal is less than or equal to a preset value, the second uplink signal on a specified number of time domain symbols at an adjacent time domain position of the first uplink signal is punctured; when the MCS index of the second uplink signal is greater than the preset value, the first uplink signal on a specified number of time domain symbols at an adjacent time domain position of the second uplink signal is punctured, or the first uplink signal is not transmitted at an adjacent time domain position of the second uplink signal;
   a guard period with a length of Y symbols is reserved between the first uplink signal and the second uplink signal, wherein the value of Y is related to a subcarrier interval used by the second communication node; and
   the second communication node decides to puncture the second uplink signal on a specified number of time domain symbols, or the second communication node decides whether to transmit the first uplink signal at an adjacent time domain symbol position of the second uplink signal.

3. The method according to claim 2, wherein the rule that an antenna port used for transmitting the first uplink signal is consistent with an antenna port used for transmitting the second uplink signal on an adjacent time domain symbol in a slot in which the first uplink signal is transmitted comprises one of the following:
   when the first uplink signal is configured to adopt antenna switching transmission, an antenna port used at a first time domain symbol for transmitting the first uplink signal is consistent with an antenna port used for transmitting the second uplink signal in the same slot; and
   when the first uplink signal is configured to adopt antenna switching transmission, an antenna port used for transmitting the first uplink signal at a time domain position corresponding to the first reference signal resource is consistent with an antenna port used for transmitting the second uplink signal in the same slot.

4. The method according to claim 2, wherein the rule that a guard period with a length of Y symbols is reserved between the first uplink signal and the second uplink signal comprises:
   when an antenna port used for the first uplink signal is inconsistent with an antenna port used for the second uplink signal, the guard period with the length of Y symbols is reserved between the first uplink signal and the second uplink signal.

5. The method according to claim 1, wherein the uplink signal is distributed at a first time domain position and a second time domain position,
   the first time domain position comprises one of the following: a time domain position of a guard period between a downlink control region and a Physical Uplink Shared Channel (PUSCH), a time domain position of a guard period between a downlink control region and a Physical Uplink Control Channel (PUCCH), a time domain position of a guard period between a downlink control region and an uplink De-Modulation Reference Signal (DMRS), and a position of first N time domain symbols of a slot, wherein N is a positive integer less than or equal to 14; and
   the second time domain position comprises one of the following: a position of the last M time domain symbols of a slot, wherein M is a positive integer less than or equal to 14.

6. The method according to claim 5, wherein in a case where an antenna port used for a Sounding Reference Signal (SRS) at the first time domain position is inconsistent with an antenna port used for the uplink DMRS, a guard period with a length of Y symbols is reserved between the SRS and the uplink DMRS.

7. The method according to claim 5, wherein
   the uplink signal located at the first time domain position and the uplink signal located at the second time domain position belong to uplink signals corresponding to different resources in a same reference signal resource set;

or,
the uplink signal located at the first time domain position and the uplink signal located at the second time domain position respectively belong to uplink signals corresponding to resources in different reference signal resource sets.

8. The method according to claim 1, wherein a sounding reference resource set configured by the first communication node to the second communication node occupies K slots, or sounding reference signal resources in a sounding reference resource set configured by the first communication node to the second communication node are distributed in K slots, wherein K is an integer greater than 1.

9. The method according to claim 8, wherein in the K slots, starting from the second slot, Y symbols are reserved between an SRS at the first occupied time domain symbol position and a PUSCH or PUCCH or uplink DMRS as a guard period.

10. The method according to claim 9, wherein the value of Y is the same as the number of time domain symbols occupied by a guard period between SRS resources in a slot.

11. The method according to claim 2, wherein the first uplink signal is an SRS, and the second uplink signal comprises at least one of the following: an uplink DMRS, an uplink signal for random access, a PUSCH signal, a phase tracking reference signal, and a PUCCH signal.

12. A method for receiving an uplink signal, comprising:
transmitting, by a first communication node, configuration information to a second communication node through physical downlink control signaling or high-layer signaling, and receiving, by the first communication node, an uplink signal transmitted by the second communication node based on the configuration information, wherein the configuration information comprises one or more slot offsets;
or,
receiving, by a first communication node according to a rule appointed with a second communication node, an uplink signal transmitted by the second communication node;
wherein receiving, by the first communication node, an uplink signal transmitted by the second communication node based on the configuration information comprises: in a case where the number of the one or more slot offsets in the configuration information is 1 and reference signal resources in a reference signal resource set configured by the first communication node for the second communication node are distributed in slot 1 and slot 2, receiving, by the first communication node, the uplink signal transmitted by the second communication node in slot 1 and slot 2; and in a case where the number of the one or more slot offsets in the configuration information is 2, reference signal resources in a reference signal resource set configured by the first communication node for the second communication node are distributed in slot 1 and slot 2, the number of reference signal resources in slot 1 is 2 and the number of reference signal resources in slot 2 is 2, receiving, by the first communication node, the uplink signal transmitted by the second communication node in slot 1 and slot 2.

13. The method according to claim 12, wherein the uplink signal comprises a first uplink signal and a second uplink signal, and the appointed rule comprises one of the following:
an antenna port used for transmitting the first uplink signal is consistent with an antenna port used for transmitting the second uplink signal on an adjacent time domain symbol in a slot in which the first uplink signal is transmitted;
when a Modulation and Coding Scheme (MCS) index of the second uplink signal is less than or equal to a preset value, the second uplink signal on a specified number of time domain symbols at an adjacent time domain position of the first uplink signal is punctured; when the MCS index of the second uplink signal is greater than the preset value, the first uplink signal on a specified number of time domain symbols at an adjacent time domain position of the second uplink signal is punctured, or the first uplink signal is not transmitted at an adjacent time domain position of the second uplink signal;
a guard period with a length of Y symbols is reserved between the first uplink signal and the second uplink signal, wherein the value of Y is related to a subcarrier interval used by the second communication node; and
the second communication node decides to puncture the second uplink signal on a specified number of time domain symbols, or the second communication node decides whether to transmit the first uplink signal at an adjacent time domain symbol position of the second uplink signal.

14. The method according to claim 13, wherein the rule that an antenna port used for transmitting the first uplink signal is consistent with an antenna port used for transmitting the second uplink signal on an adjacent time domain symbol in a slot in which the first uplink signal is transmitted comprises one of the following:
when the first uplink signal is configured to adopt antenna switching transmission, an antenna port used at a first time domain symbol for transmitting the first uplink signal is consistent with an antenna port used for transmitting the second uplink signal in the same slot; and
when the first uplink signal is configured to adopt antenna switching transmission, an antenna port used for transmitting the first uplink signal at a time domain position corresponding to the first reference signal resource is consistent with an antenna port used for transmitting the second uplink signal in the same slot.

15. The method according to claim 13, wherein the rule that a guard period with a length of Y symbols is reserved between the first uplink signal and the second uplink signal comprises:
when an antenna port used for the first uplink signal is inconsistent with an antenna port used for the second uplink signal, the guard period with the length of Y symbols is reserved between the first uplink signal and the second uplink signal.

16. The method according to claim 12, wherein the uplink signal is distributed at a first time domain position and a second time domain position,
the first time domain position comprises one of the following: a time domain position of a guard period between a downlink control region and a Physical Uplink Shared Channel (PUSCH), a time domain position of a guard period between a downlink control region and a Physical Uplink Control Channel (PUCCH), a time domain position of a guard period between a downlink control region and an uplink De-Modulation Reference Signal (DMRS), and a position of first N time domain symbols of a slot, wherein N is a positive integer less than or equal to 14; and the second time domain position comprises one of the following: a position of the last M time domain symbols of a slot, wherein M is a positive integer less than or equal to 14.

17. An apparatus for transmitting an uplink signal, comprising a memory and a processor, wherein the memory stores a computer program, and the processor is configured to execute the computer program to perform the method according to claim 1.

18. An apparatus for receiving an uplink signal, comprising: a memory and a processor, wherein the memory stores a computer program, and the processor is configured to execute the computer program to perform the method according to claim 12.

* * * * *